United States Patent
Hsieh et al.

(10) Patent No.: US 9,528,543 B2
(45) Date of Patent: Dec. 27, 2016

(54) FLASH DRIVE WITH A SNAP HOOK

(71) Applicant: PNY Technologies, Inc., Parsippany, NJ (US)

(72) Inventors: Tai-Kao Hsieh, Zhubei (TW); Hen-An Chen, Zhubei (TW)

(73) Assignee: PNY Technologies, Inc., Parsippany, NJ (US)

( * ) Notice: Subject to any disclaimer, the term of this patent is extended or adjusted under 35 U.S.C. 154(b) by 0 days.

(21) Appl. No.: 14/146,435

(22) Filed: Jan. 2, 2014

(65) Prior Publication Data

US 2015/0009618 A1 Jan. 8, 2015

(30) Foreign Application Priority Data

Jul. 2, 2013 (TW) .............................. 102212393 U

(51) Int. Cl.
*F16B 45/02* (2006.01)
*G06F 1/18* (2006.01)

(52) U.S. Cl.
CPC ............... *F16B 45/02* (2013.01); *G06F 1/182* (2013.01); *Y10T 24/3493* (2015.01)

(58) Field of Classification Search
CPC .................................. H05K 7/00; G16F 1/184
USPC .................................................... 361/679.32
See application file for complete search history.

(56) References Cited

U.S. PATENT DOCUMENTS

| 2,049,610 | A | 8/1936 | Guidry |
| D513,000 | S | 12/2005 | Cohen |
| D606,078 | S | 12/2009 | Chen |
| D624,306 | S | 9/2010 | Case |
| D624,307 | S | 9/2010 | Case |
| 7,883,353 | B2 | 2/2011 | Hao et al. |
| D633,909 | S | 3/2011 | Heath et al. |
| D640,263 | S | * 6/2011 | Huang ..................... D14/480.3 |
| D655,709 | S | 3/2012 | Huang |
| 8,179,669 | B2 | 5/2012 | Huang |
| 8,192,211 | B1 | 6/2012 | Huang |
| D662,941 | S | * 7/2012 | Emami ..................... D14/480.3 |
| D672,361 | S | 12/2012 | Huang |
| 8,542,483 | B2 | 9/2013 | Huang |
| D709,344 | S | 7/2014 | Adelman et al. |

(Continued)

OTHER PUBLICATIONS techPowerUp: A-Data S805 Flash Drive Review, [online] Jul. 14, 2009 [retrieved on Aug. 7, 2009] http://www.techpowerup.com/reviews/AData/S805_Flash_Drive/ (4 pages).

(Continued)

*Primary Examiner* — Forrest M Phillips
(74) *Attorney, Agent, or Firm* — McCarter & English, LLP

(57) ABSTRACT

A portable flash drive with snap hook for attaching the drive to an object such as a key, key chain, etc. is disclosed herein. The portable flash drive includes a housing defining a chamber, a memory unit disposed in the chamber of the housing, and a slot hook attached to an end of the housing. The slot hook includes an interior aperture, a blocking end, a pivoting end, and an opening therebetween, and a spring lever having a first arm and second arm of staggered lengths extending parallel from opposite ends of an abutment segment therebetween, the first and second arms attached to the hook at the pivoting end of the hook such that the spring lever is biased to a closed position across the opening.

10 Claims, 5 Drawing Sheets

(56) References Cited

U.S. PATENT DOCUMENTS

| | | | |
|---|---|---|---|
| D709,513 S | | 7/2014 | Huang |
| 8,929,063 B2* | | 1/2015 | Emami ................... 361/679.32 |
| D724,601 S * | | 3/2015 | Hsieh et al. .............. D14/480.3 |
| 2004/0145878 A1 | | 7/2004 | Wang |
| 2005/0277316 A1* | | 12/2005 | Cohen .......................... 439/135 |
| 2012/0087079 A1 | | 4/2012 | Ting |
| 2012/0239836 A1 | | 9/2012 | Enayati |
| 2012/0327610 A1* | | 12/2012 | Huang .......................... 361/740 |
| 2013/0044423 A1* | | 2/2013 | Huang .................... 361/679.32 |
| 2013/0182386 A1* | | 7/2013 | Emami .................... 361/679.32 |
| 2013/0265709 A1* | | 10/2013 | Huang .................... 361/679.32 |
| 2013/0327183 A1* | | 12/2013 | Tai-Kao ........................ 81/3.09 |
| 2014/0211407 A1 | | 7/2014 | Huang |

OTHER PUBLICATIONS

HP v250w 16GB USB Flash Pen Drive Disk Metal, [retrieved online on Mar. 26, 2013] http://stores.ebay.com/2ronz/USB-Flash-Drive-/_i.html?_fsub=216700 (1 page).

\* cited by examiner

FLASH DRIVE WITH A SNAP HOOK

CROSS-REFERENCE TO RELATED APPLICATION

This application claims the benefit of Taiwan Utility Model Application Serial No. 102212393 filed on Jul. 2, 2013, the entire disclosure of which is expressly incorporated herein by reference.

BACKGROUND

Field of the Disclosure

The present disclosure relates generally to an electronic component. More specifically, the present disclosure relates to a flash drive with a snap hook for attaching the drive to objects such as keys, key chains, etc.

Related Art

With the advancement and development of technology and information digitalization, users have become increasingly dependent on electronic devices and the information and files contained therein. One of the most commonly used devices for accessing and carrying digital information is a portable flash drive. Due to the small and compact size of flash drives, they are often designed with a closed key ring on the cover (e.g., shell) of the flash drive to attach the flash drive to an external item for ease of portability and loss prevention. However, such key rings can be inconvenient and difficult to use.

SUMMARY

The present disclosure relates to a flash drive with a snap hook for attaching the drive to an object such as a key, key chain, etc. The portable flash drive includes a housing defining a chamber, a memory unit disposed in the chamber of the housing, and a slot hook attached to an end of the housing. The slot hook includes an interior aperture, a blocking end, a pivoting end, and an opening therebetween, and a spring lever having a first arm and second arm of staggered lengths extending parallel from opposite ends of an abutment segment therebetween, the first and second arms attached to the hook at the pivoting end of the hook such that the spring lever is biased to a closed position across the opening.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a flash drive with a snap hook, as discussed below in connection with FIGS. 1-4B. More specifically, the flash drive disclosed herein includes a spring-biased snap hook for easy attachment of the flash drive (e.g., portable USB flash drive) to any external item, such as keys, key chains, etc.

Figure 1:
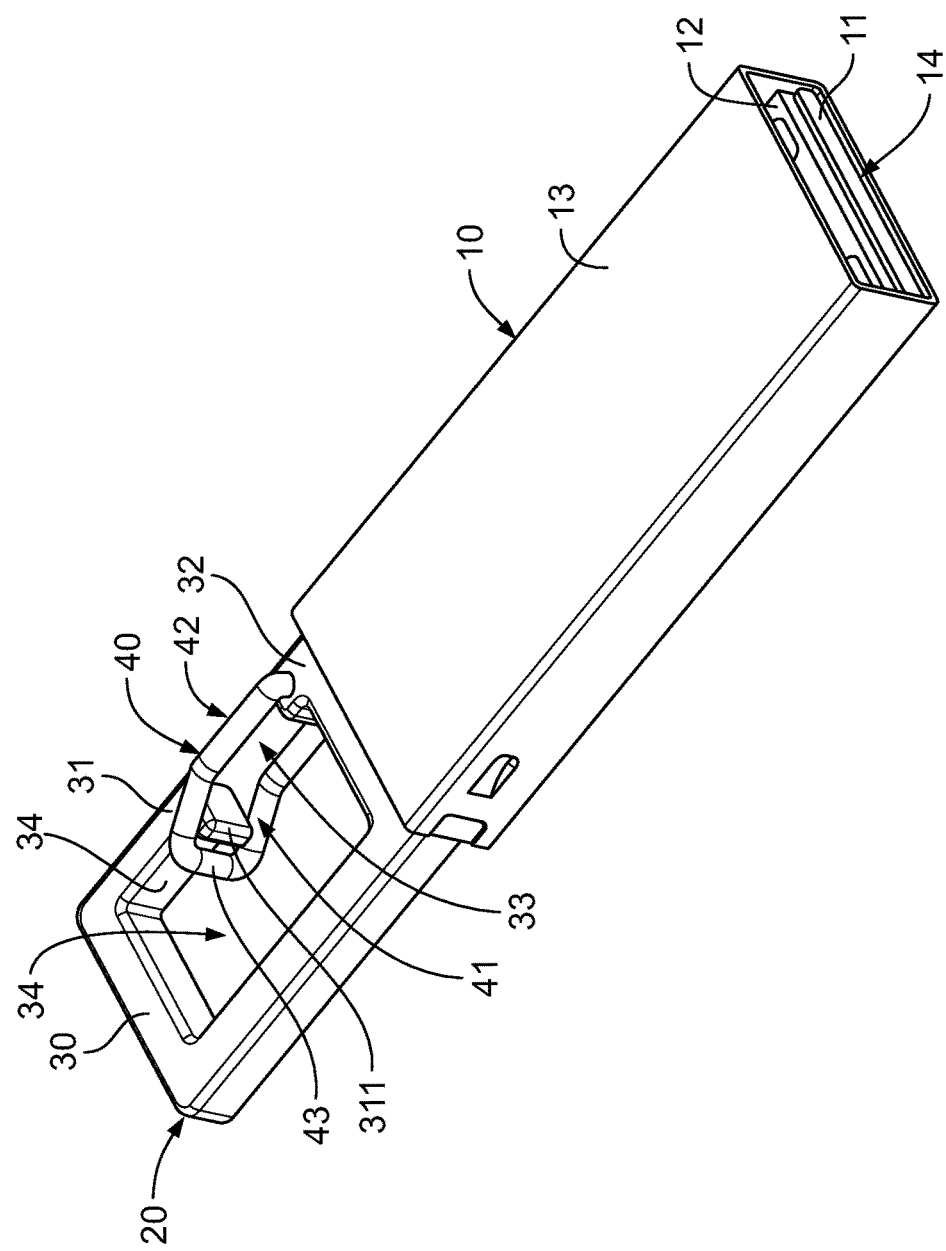
FIG. 1 is a perspective view of the flash drive with snap hook of the present disclosure.

FIG. 1 is a perspective view of a flash drive 10 of the present disclosure. The flash drive 10 includes a housing 13 and a snap hook 20 connected thereto. The housing 13 defines a chamber and includes a retaining clip 11 and memory unit 12 (e.g., flash memory), which are discussed in more detail below. The housing 13 includes an open end, and the snap hook 20 is attached to the housing 13 at an end opposite to the open end. The open end of the housing 13 and memory unit 12 define a universal serial bus (USB) interface (plug) 14 for insertion into a USB port of a computing device.

The snap hook 20 includes a hook 30 and a spring lever 40. More specifically, the hook 30 defines an interior aperture 34 and includes a blocking end 31 and a pivoting end 32, with an opening 33 defined therebetween. Further, the hook 30 has a snap protrusion 311 extending from an interior surface of the blocking end 31 of the hook 30.

The spring lever 40 has a first arm 41, a second arm 42, and an abutment segment 43 therebetween, such that the first arm 41 and the second arm 42 are connected by and extend parallel from opposite ends of the abutment segment 43. The spring lever 40 is attached to the hook at pivoting end 32, as described below.

Figure 2:
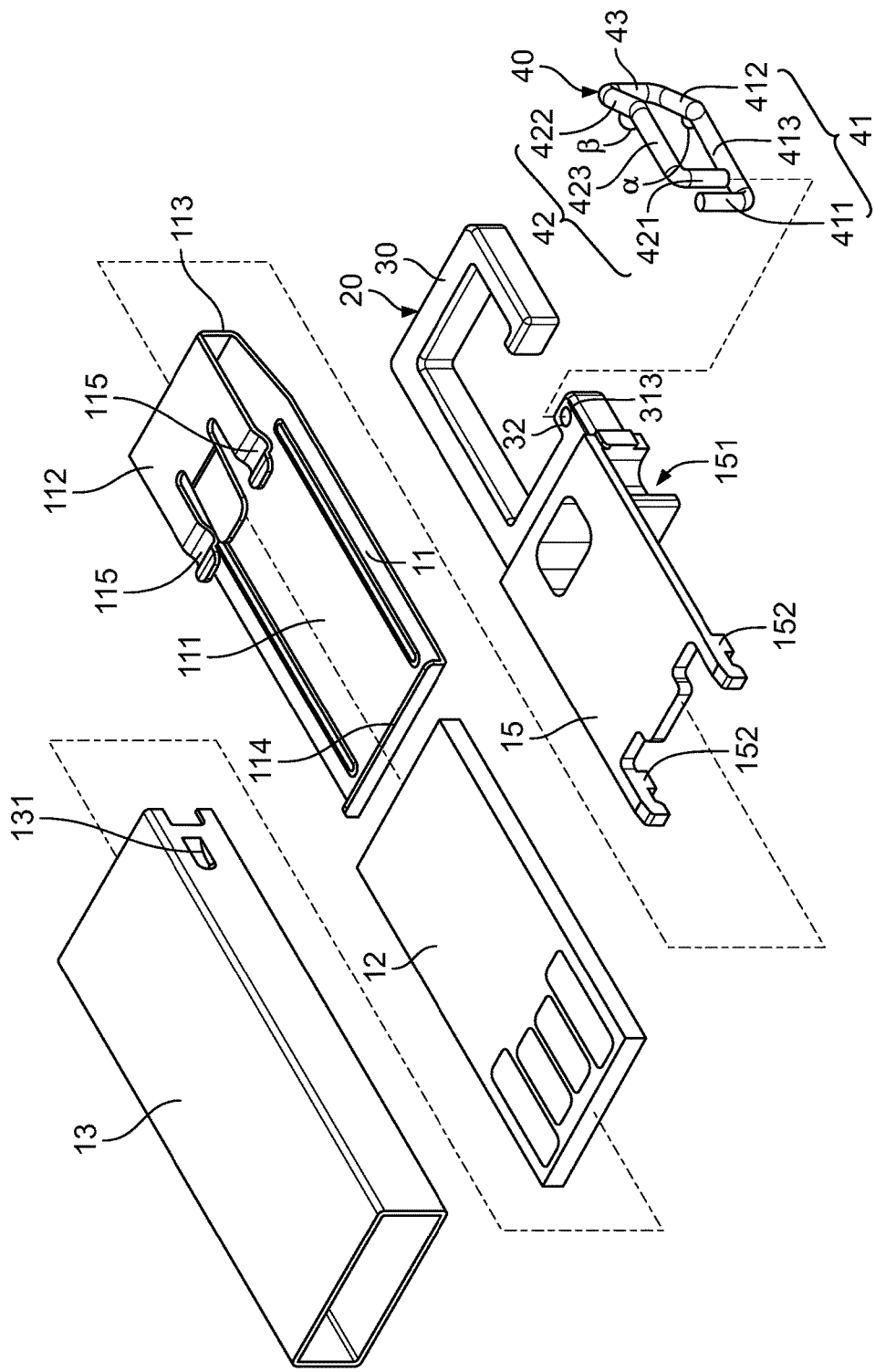
FIG. 2 is an exploded schematic view of the flash drive of FIG. 1.

FIG. 2 is an exploded schematic view of the flash drive 10 of FIG. 1. The snap hook could further include a connector 15 formed integrally with, or separately from, the hook 30. Connector 15 includes a niche 151 and engagement protrusions 152. The housing 13 includes an inwardly biased tab 131 in a sidewall thereof. The tab 131 engages niche 151 of the connector 15, thereby securing the housing 13 to the connector 15.

The retaining clip 11 includes a bottom portion 111 and top portion 112 with a back wall segment 113 therebetween, such that the bottom portion 111 and top portion 112 are connected by and extend from opposite ends of the back wall segment 113. A front wall segment 114 extends vertically from the bottom portion 111 at the end opposite the wall segment 113. The memory unit 12 could be frictionally secured between the bottom portion 111 and top portion 112, such that the front wall segment 114 prevents the memory unit 12 from sliding out from between the bottom portion 111 and top portion 112 and out of the housing 13. In this way, the retaining clip 11 holds and secures the memory unit 12 within the housing 13.

The top portion includes engagement recesses 115 at an end of the top portion 112 opposite the back wall segment 113. The engagement protrusions 152 of the connector 15 engage, respectively, the engagement recesses 115 of the retaining clip 11, thereby securing the retaining clip 11 to the connector 15. Thereby, the housing 13 is connected with the retaining clip 11 via the connector 15.

The spring lever 40 of the snap hook 20 includes a first arm 41 and second arm 42 with an abutment segment 43 therebetween. The first arm 41 comprises an upper segment 412, a lower segment 413, and a first end 411 opposite the abutment segment 43. The upper segment 412 and lower segment 413 form a first angle α less than 180 degrees (e.g., 150 degrees). The second arm 42 also comprises an upper segment 422, a lower segment 423, and a first end 421 opposite the abutment segment 43. The upper segment 422 and lower segment 423 form a second angle β less than 180 degrees (e.g., 150 degrees).

The first arm 41 and second arm 42 are of staggered lengths. In other words, the first arm 41 is longer than the second arm 42 (and more specifically, the lower section 413 of the first arm 41 is longer than the lower section 423 of the second arm 42). The first end 411 and second end 422 of the spring lever 40 are connected to the pivoting end 32 by two correspondingly staggered and oppositely extending holes 312 and 313 (see FIGS. 2 and 3). The holes 312, 313 could be through holes and/or blind holes.

Figure 3:
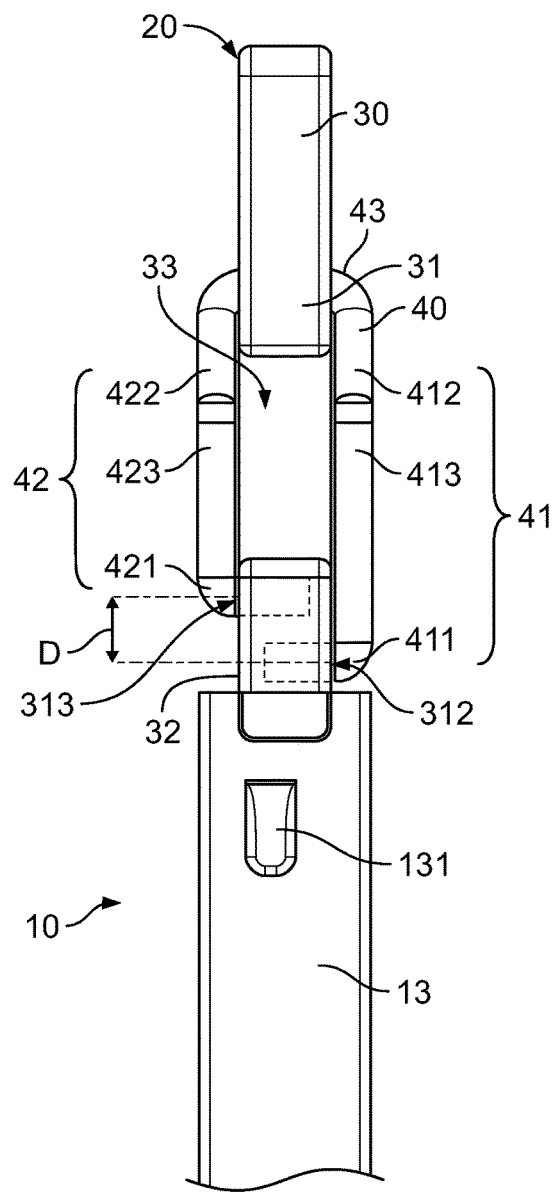
FIG. 3 is an enlarged rear view of the snap hook of the flash drive of FIG. 1.

FIG. 3 is an enlarged rear view of the snap hook 20 of the flash drive 10. As described above, the housing 13 includes a tab 131 in a sidewall thereof. The hook 30 of the snap hook 20 includes a blocking end 31 and a pivoting end 32. The spring lever 40 includes a first arm 41 and second arm 42 with an abutment segment 43 therebetween, wherein the first arm 41 includes an upper segment 412, a lower segment 413, and a first end 411, and the second arm 42 includes an upper segment 422, a lower segment 423, and a second end 421. The first end 411 of the first arm 41 is inserted into the first hole 312, and the second end 421 of the second arm 42 is inserted into the second hole 313 (where the first hole 312 and second hole 313 extend from opposite surfaces of the hook 30).

Due to the distance D between the first end 411 of the first arm 41 (and corresponding hole 312) and the second end 421 of the second arm 42 (and corresponding hole 313), the spring lever 40 has an open position and a closed position (described below in more detail), which consequently opens and closes opening 33. The spring lever 40 utilizes this staggered space (e.g., vertical displacement) between the ends of the first and second arms 411, 421 of the snap hook 30 to provide the spring lever 40 with force for biasing the lever 40 in a closed position against the blocking end 31.

Figure 4A:
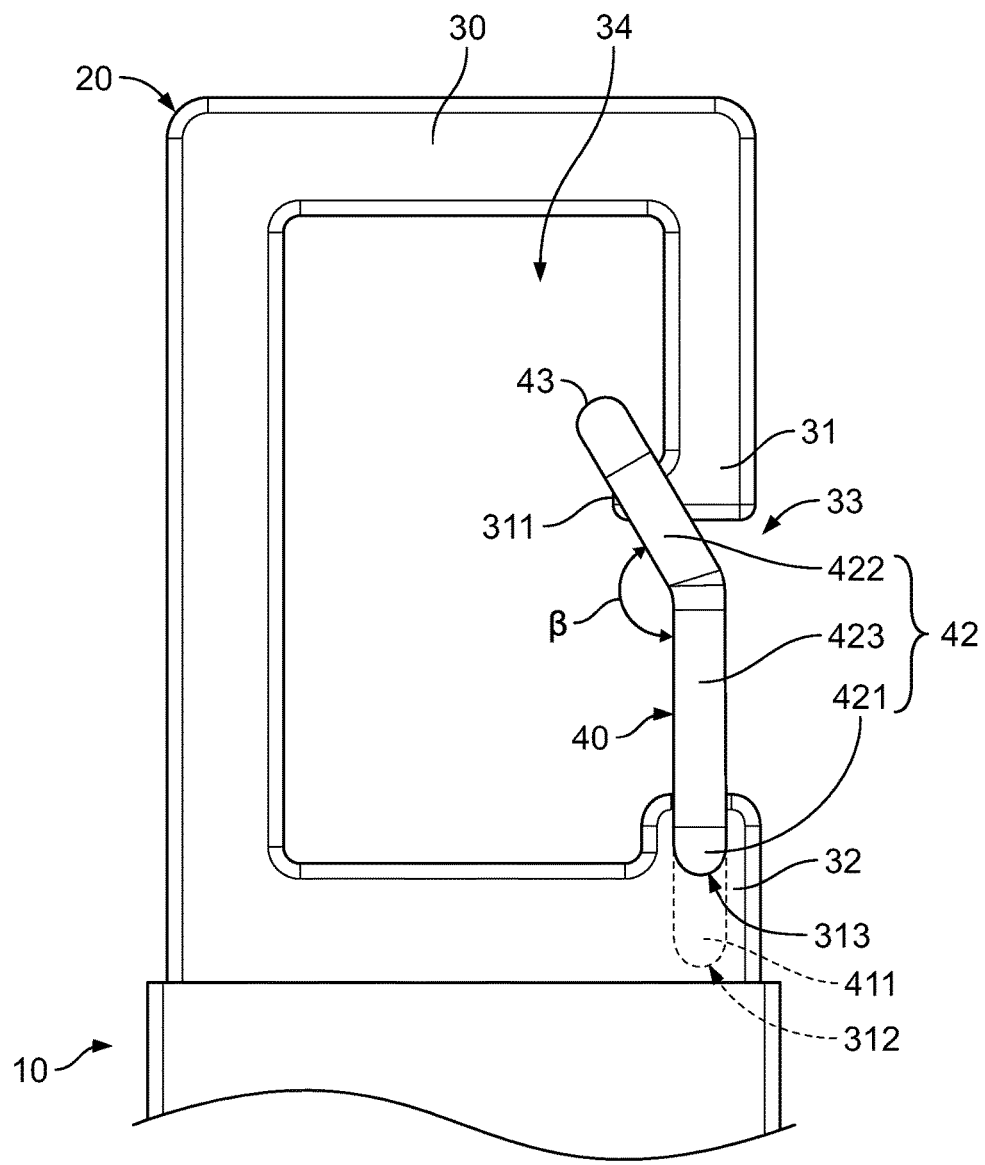
FIG. 4A is an enlarged top view of the snap hook of the flash drive of FIG. 1 showing the spring lever in a closed position.
Figure 4B:
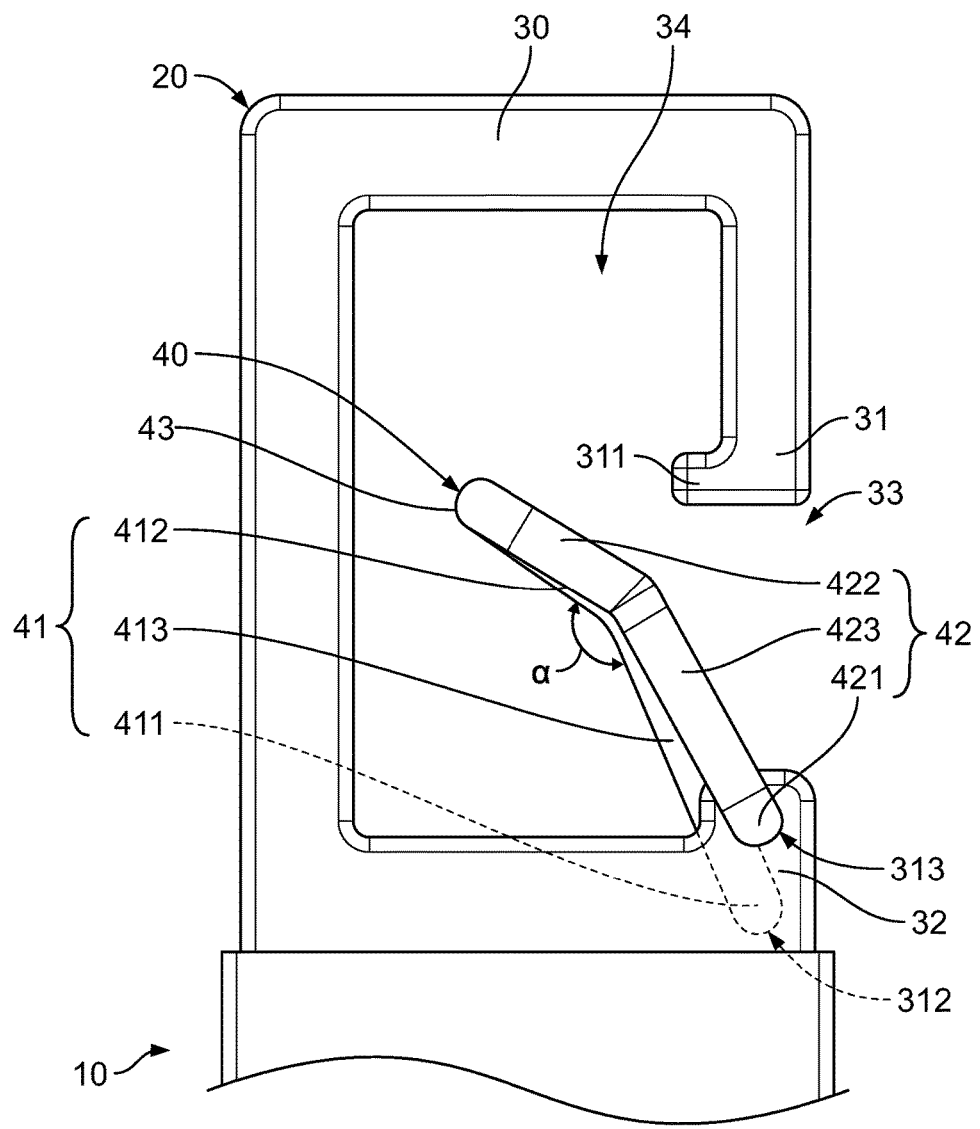
FIG. 4B is an enlarged side view of the snap hook of the flash drive of FIG. 1 showing the spring lever in an open position.

FIGS. 4A-4B are enlarged top views of the snap hook 20 of the flash drive 10 of FIG. 1, showing the device in closed and opened positions, respectively. As described above, the hook 30 of the snap hook 20 defines an interior aperture 34 and includes a blocking end 31 and a pivoting end 32 with an opening defined therebetween 33. The spring lever 40 includes a first arm 41 and second arm 42 with an abutment segment 43 therebetween, wherein the first arm 41 includes an upper segment 412, a lower segment 413, and a first end 411 inserted into hole 312, and the second arm 42 includes an upper segment 422, a lower segment 423, and a second end 421 inserted into hole 313.

FIG. 4A is an enlarged top view of the snap hook 20 of the flash drive 10 showing the spring lever 40 in a closed position. As described above, the first arm 41 and second arm 42 are of staggered lengths, and their corresponding holes 312 and 313 are also staggered (e.g., vertically displaced). The spring lever 40 is biased to the closed position (e.g., when no external force is applied to the lever 40) due to the vertical displacement of ends 411, 421. In this way, the arms 41, 42 are in alignment with one another (e.g., when viewed from the side). The mechanical deformation restoration force (e.g., torsion force) imparted to the abutment segment 43 by the first arm 41 and second arm 42 causes the abutment segment 43 to be biased against the blocking end 31 (depending on angles α, β), thereby closing the opening 33.

The angles α, β formed by the first and second arms 41, 42 could be of any angle. Preferably, the first and second arms 41, 42 form angles α, β that enable the abutment segment 43 to engage the inside surface of the blocking end 31 and/or the snap protrusion 311 (although the abutment segment 43 could also function without contacting either the blocking end 31 or the snap protrusion 311).

FIG. 4B is an enlarged top view of the snap hook 20 of the flash drive 10 with the spring lever 40 in an open position. An external force applied to the lever 40 (such as by pressing the lever 40 against a key, key chain, etc.) pushes the lever 40 inwardly and puts the spring lever 40 in the open position. As the spring lever 40 is pushed inwardly, the staggered distance of the first end 411 and second end 421 causes the first arm 41 and second arm 42 to be bent out of alignment with one another (e.g., temporary deformation). This in turn creates torsion (e.g., deformation restoration force) in abutment segment 43, which biases the spring lever 40 to the closed position when the external force is removed from the lever 40.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is intended to be protected by Letters Patent is set forth in the following claims.

The invention claimed is:

1. A portable flash drive, comprising:
a housing defining a chamber;
a memory unit disposed in the chamber of the housing;
a slot hook attached to an end of the housing, the slot hook including:
a hook defining an interior aperture and having a blocking end, a pivoting end, and an opening therebetween; and
a spring lever having a first arm and second arm of staggered lengths extending parallel from opposite ends of an abutment segment therebetween, ends of the first and second arms attached to the hook at the pivoting end of the hook so as to form a vertical displacement of the ends of the first and second arms such that the spring lever is biased to a closed position across the opening due to the vertical displacement of the ends of the first and second arms; and
the flash drive further comprising a retaining clip having a bottom portion, a top portion, a back wall segment interconnecting the bottom portion to the top portion, and a front wall segment connected to the bottom portion, the memory unit frictionally secured between the bottom portion and the top portion and the front wall segment preventing the memory unit from sliding out from between the bottom portion and the top portion, the retaining clip positioned and retained within the chamber of the housing.

2. The portable flash drive of claim 1, wherein the spring lever is rotationally positionable to an open position by application of an external force to the spring lever.

3. The portable flash drive of claim 2, wherein rotating the spring lever creates a torsion force in the abutment segment of the spring lever.

4. The portable flash drive of claim 1, wherein the first arm comprises an upper segment, a lower segment, and a first end opposite the abutment segment, the second arm comprises an upper segment, a lower segment, and a second end opposite the abutment segment, and wherein the upper and lower segments of the first arm and the upper and lower segments of the second arm each form an angle less than 180 degrees.

5. The portable flash drive of claim 4, wherein the hook further comprises a first and second holes formed in the pivoting end of the hook.

6. The portable flash drive of claim 5, wherein the spring lever is attached to the hook by insertion of the first and second ends of the first and second arms of the spring lever into first and second holes of the hook.

7. The portable flash drive of claim 5, wherein the first and second holes of the hook are vertically aligned and staggered.

8. The portable flash drive of claim 1, wherein the housing includes an open end, and the open end of the housing and memory unit define a universal serial bus (SB) interface.

9. The portable flash drive of claim 1, wherein the housing further comprises an inwardly biased tab, and the snap hook further comprises a connector attached to the hook and including a niche to receive the tab.

10. The portable flash drive of claim 1, wherein the snap hook further comprises a connector with one or more engagement protrusions to engage one or more engagement recesses formed on the top portion of the retaining clip for retaining the retaining clip and the memory unit in the housing.

* * * * *